Figure 1:
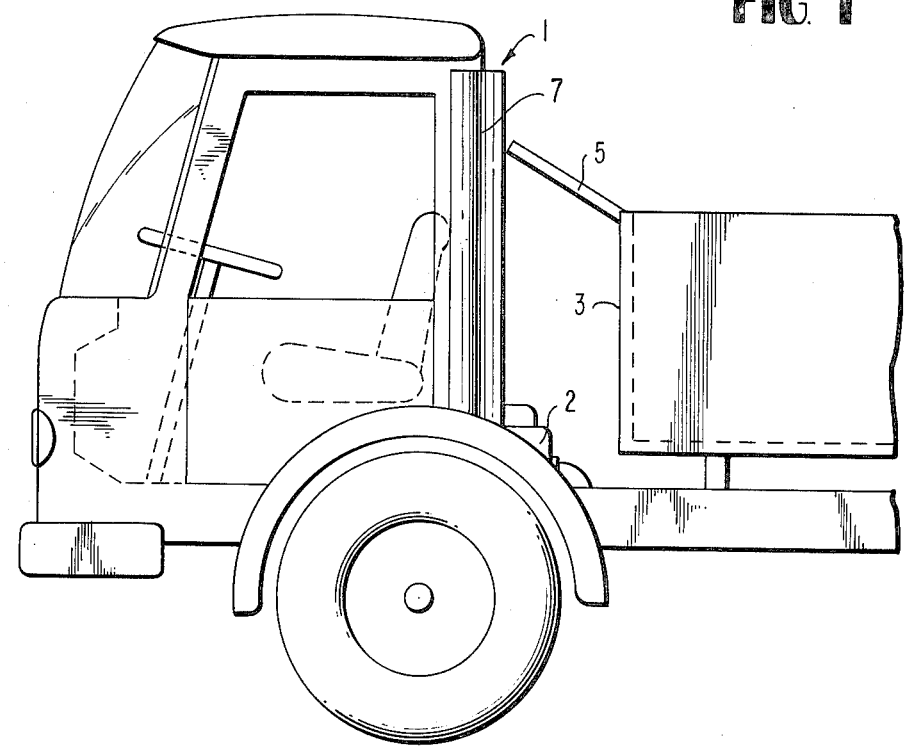

United States Patent

Gülich et al.

[11] 3,878,914
[45] Apr. 22, 1975

[54] DRIVER CAB FOR TRUCKS

[75] Inventors: Hans-Adolf Gülich; Bernd Schildhorn, both of Gaggenau, Germany

[73] Assignee: Daimler-Benz Aktiengesellschaft, Stuttgart, Germany

[22] Filed: Oct. 27, 1972

[21] Appl. No.: 301,269

[30] Foreign Application Priority Data
Oct. 28, 1971  Germany............................ 2153742

[52] U.S. Cl.......... 180/89 A; 180/54 A; 280/150 R; 296/1 S; 296/28 C
[51] Int. Cl............................................. B60k 11/00
[58] Field of Search............. 180/89 R, 89 A, 54 A; 296/1 S, 28 C; 280/150 R

[56] References Cited
UNITED STATES PATENTS

| | | | |
|---|---|---|---|
| 2,396,506 | 3/1946 | Harris | 180/89 A |
| 2,863,695 | 12/1958 | Stamm | 296/1 S |
| 2,933,344 | 4/1960 | Shumaker | 296/1 S |
| 2,947,376 | 8/1960 | Norrie | 180/89 A |
| 3,697,120 | 10/1972 | Saunders | 296/1 S |

*Primary Examiner*—David Schonberg
*Assistant Examiner*—John P. Silverstrim
*Attorney, Agent, or Firm*—Craig & Antonelli

[57] ABSTRACT

A driver cab for trucks equipped with an internal combustion engine arranged underneath the driver cab, in which air guide members extending in the generally vertical direction and projecting laterally and/or rearwardly beyond the contours of the driver cab are arranged within the areas of transition of the rear wall to the lateral surfaces of the driver cab to prevent the flow of warm air and/or exhaust gases from the internal combustion engine to within the area of the side windows of the driver cab.

16 Claims, 2 Drawing Figures

PATENTED APR 22 1975 3,878,914

DRIVER CAB FOR TRUCKS

The present invention relates to a driver cab of commercial motor vehicles such as trucks with an internal combustion engine arranged underneath the driver cab.

In modern commercial motor vehicles such as trucks, it happens frequently that a large high-power internal combustion engine is used in conjunction with relatively small driver cabs. It has been discovered that in such cases undesirable air flows may occur along the outside of the driver cab so that warm air or even exhaust gases can enter into the interior of the driver cab with opened side windows.

Especially during slow drives on inclines, a strong, upwardly directed warm air flow occurs at the driver cab rear wall of trucks with loading platform structure or semi-trailer by reason of the chimney effect. This flow splits up approximately at the height of the rear window of the driver cab and then proceeds approximately horizontally along the driver cab rear wall toward the outside. At that place, the warm air is partly sucked in the forward direction about the rear corner pillows or columns of the driver cab as a result of the lateral turbulence and enters into the interior of the driver cab when the side windows are opened.

These flow conditions occur particularly noticeably when the internal combustion engine projects rearwardly beyond the driver cab. Furthermore, these flow appearances are enhanced by a loading platform end wall projecting laterally beyond the driver cab, by an inclined protective plate customary with tilting trucks and arranged at the loading platform front wall as well as by a rounded-off contour of the driver cab within the area of the transition from the rear wall to the lateral surfaces.

Accordingly, the present invention is concerned with the task to keep away with simplest possible means the described air flow from the area of the side windows of the driver cab.

Accordingly, a driver cab of commercial motor vehicles such as trucks with an internal combustion engine arranged underneath the driver cab is proposed whereby according to the present invention, air guide bodies extending in the vertical direction and projecting laterally and/or rearwardly beyond the contour of the driver cab are arranged within the area of the transitions of the rear wall into the lateral surfaces of the driver cab, which air guide bodies preferably extend over the entire height of the driver cab.

According to a preferred embodiment of the present invention, the air guide bodies are made of elastic plastic material such as, for example, foamed materials of conventional type.

Accordingly, it is an object of the present invention to provide a driver cab for trucks which avoids by simple means the aforementioned shortcomings and drawbacks encountered in the prior art.

Another object of the present invention resides in a driver cab for commercial motor vehicles such as trucks which effectively prevents by simple means the flow of hot air from the engine into the driver compartment when the side windows of the driver cab are opened.

A further object of the present invention resides in a driver cab for trucks provided with air-deflecting bodies that not only prevent the entry of hot and/or exhaust gases from the engine into the interior of the driver cab but are also relatively inexpensive to manufacture and install as well as offer great safety against injuries to by-standing persons.

Figure 2:
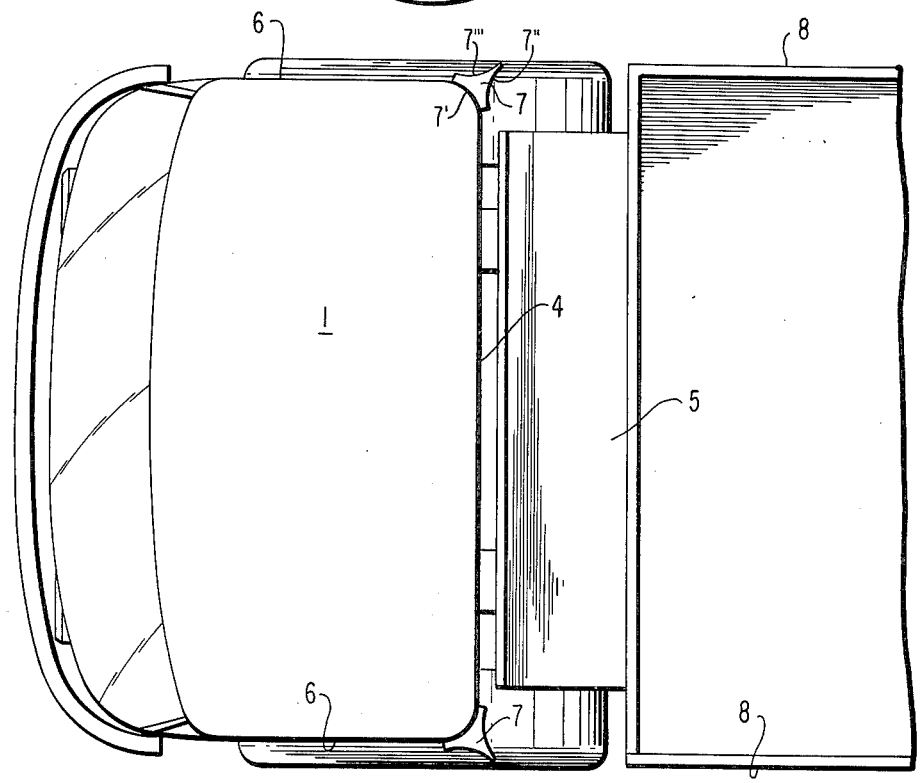

These and other objects, features, and advantages of the present invention will become more apparent from the following description when taken in connection with the accompanying drawing which shows, for purposes of illustration only, one embodiment in accordance with the present invention, and wherein:

FIG. 1 is a side elevational view of the front part of a truck with a driver cab equipped in accordance with the present invention; and FIG. 2 is a plan view on the part of the truck of FIG. 1.

Referring now to the drawing wherein like reference numerals are used throughout the two views to designate like parts, the front section of a truck is illustrated in the drawing in which an internal combustion engine 2 is arranged below the driver cab 1. The internal combustion engine 2 thereby projects slightly beyond the driver cab 1 in the rearward direction. A chimney for warm air rising from the internal combustion engine results in practice between the front end wall 3 of the loading platform of the motor vehicle and the rear wall 4 of the driver cab 1, whereby the chimney effect is still further increased by the cross-sectional constriction conditioned by the protective plate member 5. In order to prevent that the warm air conducted thereat toward the sides acts upon the side surfaces 6 of the driver cab 1, air guide bodies 7 are arranged within the area of the transition of the rear wall 4 to the side surfaces 6; in the illustrated embodiment the air guide members 7 project beyond the contour of the driver cab 1 toward the side as well as toward the rear. These air guide bodies 7 effect that the described air flow—instead of flowing in the forward direction—is deflected toward the rear in the direction toward the side walls 8 of the loading platform.

As shown more clearly in FIG. 2 each air guide body 7 is provided with a first surface portion 7' contoured to the area of transition of the rear wall 4 to the lateral surfaces 6 and a second substantially concaved surface 7'' for directing the flow of hot air and the gases from the rear wall 4 of the driver cab 1 to the rear of the vehicle. A second surface portion 7'' is disposed rearwardly of the first surface with a portion of the second surface portion 7'' extending laterally beyond the contour of the driver cab 1. Each air guide body 7 is further provided with a third substantially concave surface portion 7''' for directing the flow of air along the lateral surfaces 6 of the driver cab 1 outwardly and to the rear of the vehicle.

While we have shown and described only one embodiment in accordance with the present invention, it is understood that the same is not limited thereto but is susceptible of numerous changes and modifications as known to those skilled in the art. For example, the possibility exists, of course, to provide such types of air guide bodies already during the shaping of the driver cab, i.e., in the manufacture of the parts forming the driver cab body. However, it will be preferred in most cases for safety reasons to make the air guide bodies of elastic material and to secure the same subsequently at the driver cab. As mentioned before, these air guide bodies may be made of any suitable elastic material, for example, of foamed synthetic resinous material of conventional type.

Thus, it is apparent that the present invention is not limited to the details shown and described herein, and we therefore do not wish to be limited to these details but intend to cover all such changes and modifications are are encompassed by the scope of the appended claims.

What we claim is:

1. In a driver cab of commercial vehicles with an internal combustion engine arranged underneath the driver cab, said driver cab including a rear wall and lateral side walls, the improvement comprising air guide body means for preventing the flow of hot air and gases from the internal combustion engine along the rear wall to the lateral side walls of the driver cab disposed at the transition of the rear wall to the lateral side walls of the driver cab, said air guide body means including a first surface portion disposed along a respective lateral side walls of the driver cab and extending rearwardly and outwardly from the driver cab, a second surface portion disposed along the rear wall and extending outwardly and rearwardly of said cab and intersecting said first surface portion, said air guide body means extending generally in a vertical direction of the driver cab.

2. A driver cab according to claim 1, wherein said air guide means extends over the entire height of the driver cab.

3. A driver cab according to claim 2, wherein said air guide body means includes a further surface portion contoured to the area of transition of the rear wall to the lateral surfaces, and wherein the second surface portion directs the flow of hot air and gases from the rear wall of the cab to the rear of the vehicle.

4. A driver cab according to claim 1, characterized in that the air guide body means extends substantially over the entire height of the driver cab.

5. A driver cab according to claim 4, characterized in that the air guide body means are made of elastic material.

6. A driver cab according to claim 5, characterized in that the elastic material is a synthetic resinous material.

7. A driver cab according to claim 6, characterized in that the elastic material is a foamed material.

8. A driver cab according to claim 1, characterized in that the air guide body means are made of elastic material.

9. A driver cab according to claim 8 characterized in that the elastic material is a synthetic resinous material.

10. A driver cab according to claim 8, characterized in that the elastic material is a foamed material.

11. A driver cab according to claim 1, wherein said air guide body means includes a further surface portion contoured to the area of transition of the rear wall to the lateral side walls, and wherein the second surface portion directs the flow of hot air and the gases from the rear wall of the cab to the rear of the vehicle.

12. In a driver cab of commercial motor vehicles with an internal combustion engine arranged underneath the driver cab, said driver cab including a rear wall and lateral side walls, the improvement comprising air guide body means for preventing the flow of hot air and gases from the internal combustion engine along the rear wall to the lateral side walls of the driver cab disposed within the area of the transition of the rear wall to the lateral side walls of the driver cab, said air guide body means extending generally in a vertical direction, said air guide body means including a first surface contoured to the area of transition of the rear wall to the lateral side walls and a second surface for directing the flow of hot air and the gases from the rear wall of the cab to the rear of the vehicle, said second surface is substantially concave and is disposed rearwardly of said first surface with a portion of said second surface extending laterally beyond the contour of the cab.

13. A driver cab according to claim 12, wherein said air guide body means includes a third surface for directing the flow of air along the lateral side walls of the cab outwardly and to the rear of the vehicle.

14. A driver cab according to claim 13, wherein said third surface is substantially concave.

15. A driver cab according to claim 14, wherein said air guide means extends over the entire height of the driver cab.

16. A driver cab according to claim 15, wherein said air guide body means are made of an elastic material.

* * * * *